United States Patent
Chern et al.

(10) Patent No.: US 12,430,106 B2
(45) Date of Patent: Sep. 30, 2025

(54) CONSTRUCTING EXECUTABLE PROGRAM CODE BASED ON SEQUENCE CODES

(71) Applicant: EQUIFAX INC., Atlanta, GA (US)

(72) Inventors: Jih-Shiang Chern, Alpharetta, GA (US); Bo Yan, Alpharetta, GA (US)

(73) Assignee: EQUIFAX INC., Atlanta, GA (US)

( * ) Notice: Subject to any disclaimer, the term of this patent is extended or adjusted under 35 U.S.C. 154(b) by 197 days.

(21) Appl. No.: 18/253,466

(22) PCT Filed: Nov. 22, 2021

(86) PCT No.: PCT/US2021/072535
§ 371 (c)(1),
(2) Date: May 18, 2023

(87) PCT Pub. No.: WO2022/109613
PCT Pub. Date: May 27, 2022

(65) Prior Publication Data
US 2023/0418570 A1    Dec. 28, 2023

Related U.S. Application Data

(60) Provisional application No. 63/117,059, filed on Nov. 23, 2020.

(51) Int. Cl.
*G06F 8/34* (2018.01)
*G06F 9/451* (2018.01)

(52) U.S. Cl.
CPC ............... *G06F 8/34* (2013.01); *G06F 9/451* (2018.02)

(58) Field of Classification Search
None
See application file for complete search history.

(56) References Cited

U.S. PATENT DOCUMENTS 6,085,196 A * 7/2000 Motoyama .............. H04L 67/02
                                                       707/999.102
9,923,916 B1 * 3/2018 McClintock ............ G06F 21/53
(Continued)

OTHER PUBLICATIONS

International Application No. PCT/US2021/072535, "International Search Report and Written Opinion", Mar. 2, 2022, 14 pages.
(Continued)

*Primary Examiner* — Qing Chen
(74) *Attorney, Agent, or Firm* — Kilpatrick Townsend & Stockton LLP

(57) ABSTRACT

Methods described herein generate executable program code based on sequence codes, such that the executable program code is executable by a computer processor. According to such a method, a command is received to generate executable program code. Via a code-building interface, user input is received indicating an operation to be performed by the executable program code, a data type for to the executable program code, and a condition for applying the executable program code. A sequence code is constructed to represent the user input, where the sequence code includes a sequence of character sets. From the sequence code, a first character set corresponding to the operation, a second character set corresponding to the data type, and a third character set corresponding to the condition are extracted. Mapping data is applied to the first character set, the second character set, and the third character set to generate the executable program code.

20 Claims, 7 Drawing Sheets

(56) References Cited

U.S. PATENT DOCUMENTS

| | | |
|---|---|---|
| 12,056,331 B1* | 8/2024 | Benson ................. G06F 40/106 |
| 2003/0158759 A1 | 8/2003 | Kannenberg |
| 2007/0044041 A1 | 2/2007 | Beynon et al. |
| 2007/0214111 A1* | 9/2007 | Jin ........................ G06F 16/245 |
| 2009/0299974 A1* | 12/2009 | Kataoka ............ G06F 16/90344 |
| 2020/0250260 A1 | 8/2020 | Portisch et al. |

OTHER PUBLICATIONS

PCT/US2021/072535, "International Preliminary Report on Patentability", Jun. 1, 2023, 11 pages.

\* cited by examiner

CONSTRUCTING EXECUTABLE PROGRAM CODE BASED ON SEQUENCE CODES

CROSS-REFERENCE TO RELATED APPLICATIONS

This claims the benefit and priority under 35 U.S.C. 119(e) of U.S. Provisional Application No. 63/117,059, filed Nov. 23, 2020, and titled "Software Development Tools for Building Attribute Program Code Based on Sequence Codes," the contents of which are herein incorporated by reference as if set out below.

TECHNICAL FIELD

This relates generally to software development platforms and, more specifically, to software development platforms using sequence codes to facilitate the development or testing of executable program code configured to apply attributes to datasets.

BACKGROUND

Data-processing systems can be used to generate output data for analytical purposes by analyzing and transforming input data that is stored at a data source. For instance, given a data source that describes a set of entities and attributes describing those entities, a data-processing system could generate output data predicting outcomes related to such entities. Existing processes, both manual and automated, for constructing program code useable by data-processing systems have various drawbacks in terms of efficiency or accuracy.

In an example of a manual process, when a user desires for a data-processing system to analyze and transform the input data of a data source in a certain way, the user typically specifies to a computer programmer a set of criteria and data-processing attributes, as well as desired formats of the output data to be delivered. The programmer then generates program code for accessing the data source and performing the desired analysis. This process can involve considerable manual effort to interpret the user's request into executable program code that can operate on the relevant data sources. For example, an analyst familiar with the input data and with data analytics processes may need to act as a middle-man between the user and the programmer, to explain to the programmer what is needed. The computer programmer then writes program code with functions to execute on the data source to return the requested output data. This process can involve subjective decision-making that increases the chance of coding errors or increases the complexity involved in testing the functionality of the program code. The manual effort involved in modeling, formatting, and testing programming to return results in a desired form, auditing the results, and other aspects of delivering the desired results to the analyst or the user can be time-consuming and expensive.

In another example, automatic programming involves generating program code automatically. Typically, automatic programming involves first manually building a library of subroutines. A user is thus enabled to provide pseudo-code statements, where each such statement is automatically replaced by a subroutine in the library to form the desired executable program code. However, a primary drawback of existing automatic programming is that the library of subroutines must be extensive to cover every possible task the user might need performed.

SUMMARY

Various aspects of the present disclosure provide techniques for constructing a sequence code from user input provided at a code-building interface and, further, using that sequence code to generate executable program code that can be executed by a computer processor. Some examples involve a software development platform configured to provide a code-building interface. The code-building interface includes an operation-selection menu for selecting one or more operations to be performed by the executable program code, a type-selection menu for selecting one or more data types, and a condition menu for selecting one or more conditions for the executable program code.

A user can utilize the code-building interface to provide user input in the form of selections via the operation-selection menu, the type-selection menu, and the condition menu. Based on the user input, the software development platform can generate a sequence code representing the selections made. The sequence code can include multiple characters sets (e.g., letters and digits), with each character set conveying information needed to build the executable program code. A code-building engine of the software development platform can then utilize the sequence code to build the executable program code.

In some examples, to build the executable program code, the code-building engine extracts from the sequence code a first character set corresponding to an operation, a second character set corresponding to a data type, and a third character set corresponding to a condition. The code-building engine accesses one or more mappings that associate the first character set with an executable program code module that performs the operation, associate the second character set with a data source having records matching the data type, and associate the third character set with the condition. The code-building engine modifies the executable program code module to apply the condition to data retrieved from the data source and, thus, generates the executable program code. The executable program code can then be executed by a computer processing device.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
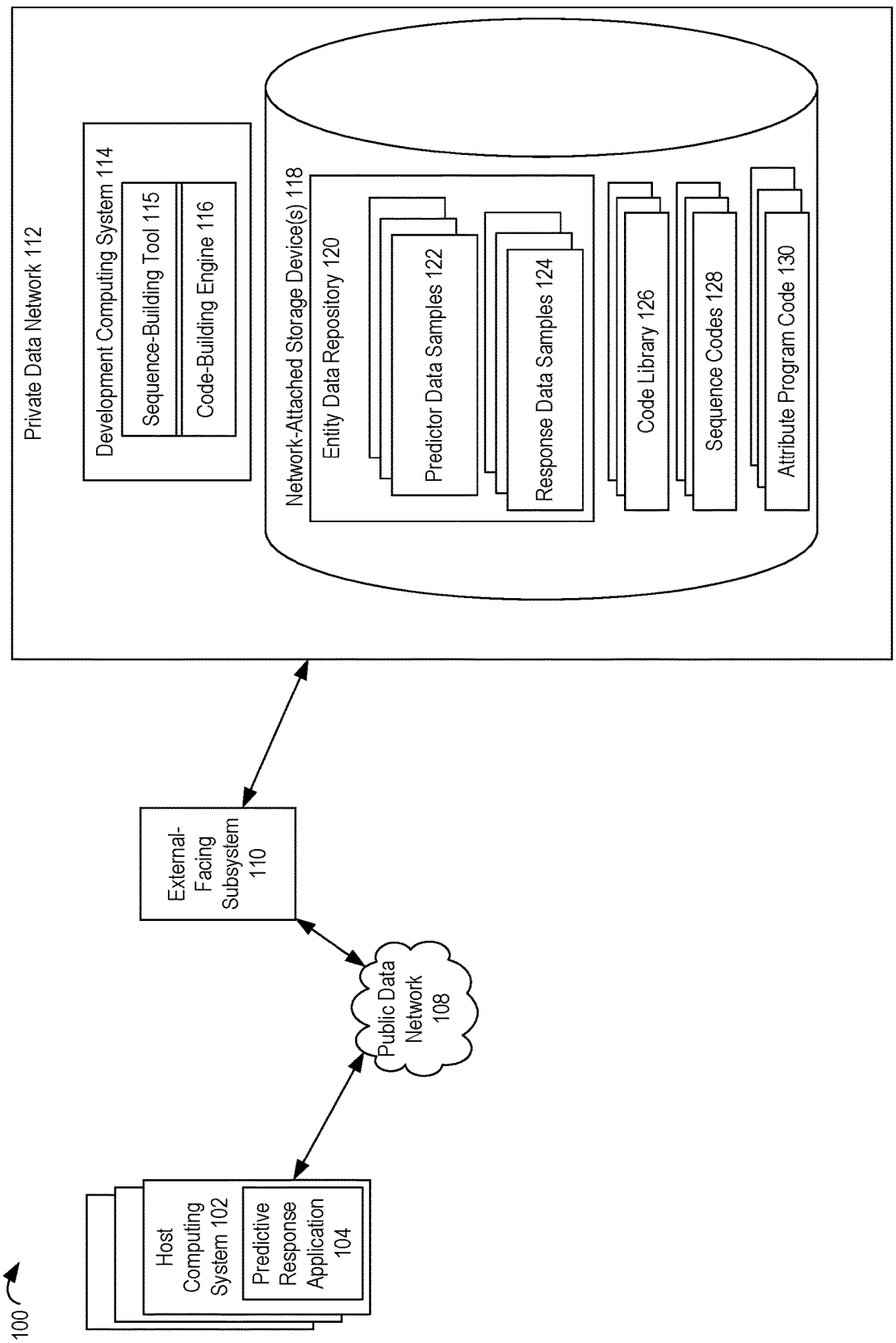
FIG. 1 is a diagram depicting an example of a computing environment in which a development computing system builds executable program code from a sequence code.

Certain aspects and features of the present disclosure involve using sequence codes constructed via intuitive code-building interfaces to automatically generate executable program code for execution by a computing system. For instance, a development computing system can receive, from a user device, a command to generate executable program code. To service this command, the development computing system obtains, via a code-building interface, user inputs that identify one or more operations to be performed, one or more data sources that provide input data for the operations, and one or more conditions for querying the data sources. A sequence code is generated based on the user inputs, and the sequence code includes one or more character sets (e.g., letters and digits) that correspond to the operations, data sources, and conditions. The sequence code can provide meaningful information for building the executable program code. The development computing system parses the sequence code to select relevant program code modules and identify configuration data (e.g., data source locations, condition parameters) for the program code modules. The development computing system automatically generates the executable program code from one or more selected program code modules and associated configuration data. In some examples, the executable program code can be executed by a computer processing device to apply data-processing attributes to datasets, so as to generate output data based on input data in such datasets.

In an illustrative example, the development computing system can configure a user device to present a code-building interface. The code-building interface can include interface elements for easily identifying, with natural language-based inputs, different components for use by a back-end software development platform. Examples of these interface elements include an operation-selection menu for selecting one or more operations to be performed by the executable program code, a type-selection menu for selecting one or more data types, and a condition menu for selecting one or more conditions for the executable program code. In this example, a user would like to generate a coding instruction to calculate the total balance of a consumer's bank card trades as reported in the last three months. From the operation-selection menu, the user selects an operation to calculate a total balance of a given type of trade over a given period. From the type-selection menu, the user selects a bank card option. From the condition menu, the user selects an option indicating transactions reported over the last three months, such that having been reported during the last three months is the condition under which the operation applies to each transaction.

In this example, the user selections received via this code-building interface are used to generate a sequence code. For instance, an executable program code module is pre-defined and already includes pre-written code to compute a total balance of transactions, and that executable program code module is associated with a corresponding character set, such as "401" in this example. In this case, the data type is "bank card," which is associated with a character set equal to "12." The three-months condition is associated with a character set equal to "2." Thus, the development computing system generates a full sequence code for the operations selected through the code-building interface as "401122000" in an example where sequence codes are nine characters long. This sequence code represents a unique instruction that would not be confused with similar instructions.

Continuing with this example, a code-building engine of the software development platform extracts a first character set corresponding to an operation selected via the operation-selection menu, a second character set corresponding to a data type selected via the type-selection menu, and a third character set corresponding to a condition selected via the condition menu. For instance, the data type could identify an industry and the data from the data source could describe transactions specific to the industry, whereas the condition could include a time component and a rating component represented by different subsets of the third character set. In the above specific case, the first character set is "401," the second character set is "12," and the third character set is "2."

For example, the code-building engine accesses mapping data (i.e., data that enables mapping) that associates (a) the first character set with a set of executable program code that performs the operation, (b) the second character set with a data source having records matching the data type, and (c) the third character set with the condition. The code-building engine selects an executable program code module identified via the mapping data and updates the selected executable program code module to apply the condition to data retrieved from the data source. For instance, in the above specific case, the code-building engine maps the character set "401" to the executable program code module that was pre-defined. The code-building engine then modifies the executable program code module to operate on bank card trades occurring within the past three months.

Certain aspects described herein generate executable program code configured for use by a processing device to transform input data to output data. Aspects described herein can provide improvements over existing solutions for generating program code that applies data-processing attributes to datasets. Some existing solutions for developing executable program code may require users to have extensive programming knowledge to create and test appropriate the executable program code, or require programmers to rely on subjective judgment regarding how to build executable program code that accurately implements the goals and specifications of an analyst or other end user. Relying on these subjective determinations could decrease the utility of software development tools. Other existing solutions require an overwhelmingly large library of existing subroutines to account for the range of tasks that could be needed. Such libraries are inefficient in terms of computing resources.

Aspects described herein can improve the functionality of software development tools for building such executable program code by decreasing or avoiding this reliance on subjective, manual determinations by programmers or requirements of programming knowledge on the part of end users. For instance, utilizing a sequence code to build executable program code involves applying particular rules, such as parsing the sequence code to identify character sets and using the character sets with mapping data to select program code templates and configuration data, that automate the operation of software development tools for building executable program code. These features can reduce the manual, subjective effort involved with programmatically implementing a desired attribute for a dataset and, in some cases, reduce the resources required for identifying and correcting coding errors in an auditing process.

Furthermore, in some aspects, various interfaces described herein provide intuitive functionality for building sequence codes via interface elements that guide the user's selection of different options (e.g., program code templates, configuration data, etc.) that will ultimately be represented via different character sets in a sequence code. The interface features can allow end users without programming knowledge to intuitively update program code of decision algorithms in real time. Thus, the particular rules applied by certain aspects described herein, either alone or in combination with the structural features of a code-building interface used to generate these sequence codes, thereby improve the functionality of these software development tools. Accordingly, automated computing systems that rely on executable program code developed as described herein can be reconfigured more efficiently and effectively as compared to existing systems.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Example of a Computing Environment for Implementing Certain Aspects

Referring now to the drawings, FIG. 1 is a block diagram depicting an example of a computing environment 100 in which a development computing system 114 can be used to build one or more sets of executable program code 130 from one or more sequence codes 128. FIG. 1 depicts examples of hardware components of a computing environment 100, according to some aspects. The numbers of devices depicted in FIG. 1 are provided for illustrative purposes. Different numbers of devices may be used. For example, while various elements are depicted as single devices in FIG. 1, multiple devices may instead be used, such as in a case where the development computing system 114 is distributed across those multiple devices.

The computing environment 100 can include one or more host computing systems 102. A host computing system 102 can communicate with a development computing system 114. For example, a host computing system 102 may send data to the development computing system 114 to be processed, may send signals to a target system to control different aspects of the computing environment or the data it is processing, or some combination thereof. A host computing system 102 can interact with the development computing system 114, the host computing system 102, or both via one or more data networks, such as a public data network 108 such as the Internet.

A host computing system 102 can include a suitable computing device or group of devices, such as a server or a set of servers that collectively operate as a server system. Examples of host computing systems 102 include a mainframe computer, a grid computing system, or other computing system that uses attribute program data 130. For instance, a host computing system 102 may be a host server system that includes one or more servers that execute a predictive response application 104 and one or more additional servers that control an operating environment. Examples of an operating environment include (but are not limited to) a website or other interactive computing environment, an industrial or manufacturing environment, a set of medical equipment, a power-delivery network, etc. In some aspects, one or more host computing systems 102 may include network computers, sensors, databases, or other devices that may transmit or otherwise provide data to the development computing system 114. For example, the computing devices may include local area network devices, such as routers, hubs, switches, or other computer networking devices.

In some aspects, the host computing system 102 can execute a predictive response application 104 or a client application that accesses a predictive response application 104 from a server system. A predictive response application 104 can perform one or more operations that generate a predicted response, which describes or otherwise indicates a predicted behavior associated with an entity. Examples of an entity include a system, an individual interacting with one or more systems, a business, a device, or others. A predictive response application 104 can utilize executable program code 130 that has been developed using the code-building engine 116, as described in further detail herein. For instance, predicted response outputs can be computed by performing operations that receive, as inputs, attribute data generated by executing the executable program code 130.

The computing environment 100 can also include a development computing system 114. The development computing system 114 may include one or more other devices or subsystems. For example, the development computing system 114 may include one or more computing devices (e.g., a server or a set of servers), a database system for accessing the network-attached storage devices 118, a communications grid, or both. A communications grid may be a grid-based computing system for processing large amounts of data.

The development computing system 114 can include one or more processing devices that execute one or more software engines or software tools stored on a non-transitory computer-readable medium, such as a sequence-building tool 115 and a code-building engine 116. The sequence-building tool 115 is used to build one or more sequence codes 128. The code-building tool is used to generate executable program code 130 from a sequence code 128.

In some aspects, the sequence building tool 115 executes program code that provides a graphical interface, such as a code-building interface, to a user device (e.g., a host computing system 102) for display. The sequence building tool 115 also executes program code that receives input, such as one or more user selections, via such a graphical interface. The sequence building tool 115 also executes program code that generates outputs, such as a sequence code 128 based on the input received via the graphical interface. Examples of graphical interfaces that are generated or used by the sequence building tool 115 are described herein with respect to FIGS. 3A-3D.

The code-building engine 116 can generate or update one or more sets of executable program code 130 using one or more sequence codes 128. An example of a sequence code 128 includes one or more character sets that identify (a) one or more operations to be performed (e.g., operations performed by coding templates included in a code library 126, predictor data samples 122, or response data samples 124), (b) one or more data sources for the operations (e.g., one or more data repositories storing predictor data samples 122 or response data samples 124), and (c) one or more conditions to be used in the operations. For instance, a first character set of a sequence code 128 identifies (e.g., via mapping data) a first operation to be performed, a second character set of the sequence code 128 identifies a data source for the operations, and a third character set of the sequence code 128 identifies a condition for which the operations are applicable. More specifically, for instance, as described in further detail with respect to the examples of FIGS. 2-5, the code-building engine 116 can use a first character set from a sequence code to identify a particular executable program code module (i.e., pre-written source code) in a code library 126, a second character set from the sequence code to identify an entity data repository to be queried by one or more operations in the identified source code, and a third or additional character sets to identify parameters (e.g., timeframe, rating, or other parameters) to be used in the queries. The code-building engine 116 can generate or update the executable program code 130 by modifying the identified source code to include references to the identified data source and to set variable values based on the identified parameters. The executable program code 130 can include program code (e.g., source code) that is executable by one or more processing devices.

The development computing system 114 may transmit, or otherwise provide access to, executable program code 130 that has been generated or updated with the code-building engine 116. For instance, a computing system that executes a predictive response application 104 can access the executable program code 130 and incorporate operations of the executable program code 130 into operations performed by predictive response application 104.

The computing environment 100 may also include one or more network-attached storage devices 118. The network-attached storage devices 118 can include memory devices for storing an entity data repository 120 and executable program code 130 to be processed by the development computing system 114. In some aspects, the network-attached storage devices 118 can also store any intermediate or final data generated by one or more components of the computing environment 100.

The entity data repository 120 can store predictor data samples 122 and response data samples 124. The predictor data samples 122 can include values of one or more predictor variables 124. The external-facing subsystem 110 can prevent one or more host computing systems 102 from accessing, via a public data network 108, one or more of the entity data repository 120, the code library 126, sequence codes 128 generated by other host computing systems 102, and executable program code 130 generated by other host computing systems 102. The predictor data samples 122 and response data samples 124 can be provided by one or more host computing systems 102 or consumer computing systems, generated by one or more host computing systems 102 or consumer computing systems, or otherwise communicated within a computing environment 100 via a public data network 108.

For example, a large number of observations can be generated by electronic transactions, where a given observation includes one or more predictor variables 124 (or data from which a predictor variable 124 can be computed or otherwise derived), which can be included in predictor data samples 122. A given observation can also include data for a response variable or data from which a response variable value can be derived. Examples of predictor variables 124 can include data associated with an entity, where the data describes behavioral or physical traits of the entity, observations with respect to the entity, prior actions or transactions involving the entity (e.g., information that can be obtained from credit files or records, financial records, consumer records, or other data about the activities or characteristics of the entity), or any other traits that may be used to predict the response associated with the entity. In some aspects, samples of predictor variables 124, response variables, or both can be obtained from credit files, financial records, consumer records, etc.

Network-attached storage devices 118 may also store a variety of different types of data organized in a variety of different ways and from a variety of different sources. For example, network-attached storage devices 118 may include storage other than primary storage located within development computing system 114 that is directly accessible by processors located therein. Network-attached storage devices 118 may include secondary, tertiary, or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

Communications within the computing environment 100 may occur over one or more public data networks 108. In one example, communications between two or more systems or devices can be achieved by a secure communications protocol, such as secure sockets layer ("SSL") or transport layer security ("TLS"). In addition, data or transactional details may be encrypted. A public data network 108 may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or combination of wireless interfaces. A wired network may include a wired interface. The wired or wireless networks may be implemented using routers, access points, bridges, gateways, or the like, to connect devices in a data network.

The computing environment 100 can secure communications among different devices, such as host computing systems 102, consumer computing systems, development computing systems 114, or some combination thereof. For example, the client systems may interact, via one or more public data networks 108, with various one or more external-facing subsystems 110. As mentioned above, an external-facing subsystem 110 can prevent a host computing system 102 from accessing, via the public data network 108, one or more of the entity data repository 120, the code library 126, sequence codes 128 generated by other host computing systems 102, or executable program code 130 generated by other host computing systems 102. In some examples, each external-facing subsystem 110 includes one or more computing devices that provide a physical or logical subnetwork (sometimes referred to as a "demilitarized zone" or a "perimeter network") that expose certain online functions of the computing environment 100 to an untrusted network, such as the Internet or another public data network 108.

Each external-facing subsystem 110 can include, for example, a firewall device that is communicatively coupled to one or more computing devices forming a private data network 112. A firewall device of an external-facing subsystem 110 can create a secured part of the computing environment 100 that includes various devices in communication via a private data network 112. In some aspects, as in the example depicted in FIG. 1, the private data network 112 can include the development computing system 114, which executes the sequence-building tool 115 and the code-building engine 116, and one or more network-attached storage devices 118, which can store an entity data repository 120. In additional or alternative aspects, the private data network 112 can include one or more host computing systems 102 that execute a predictive response application 104.

In some aspects, through use of the private data network 112, the development computing system 114 and the entity data repository 120 are housed in a secure part of the computing environment 100. This secured part of the computing environment 100 can be an isolated network (i.e., the private data network 112) that has no direct accessibility via the Internet or another public data network 108. Various devices may also interact with one another via one or more public data networks 108 to facilitate electronic transactions between users of the consumer computing systems and online services provided by one or more host computing systems 102.

Host computing systems 102 can be configured to provide information in a predetermined manner. For example, host computing systems 102 may access data to transmit in response to a communication. Different host computing systems 102 may be separately housed from each other device within the computing environment 100, such as development computing system 114, or may be part of a device or system. Host computing systems 102 may host a variety of different types of data processing as part of the computing environment 100. Host computing systems 102 may receive a variety of different data from the computing devices 102a-c, from the development computing system 114, from a cloud network, or from other sources.

Examples of Using Sequence Codes to Build Executable Program Code

Figure 2:
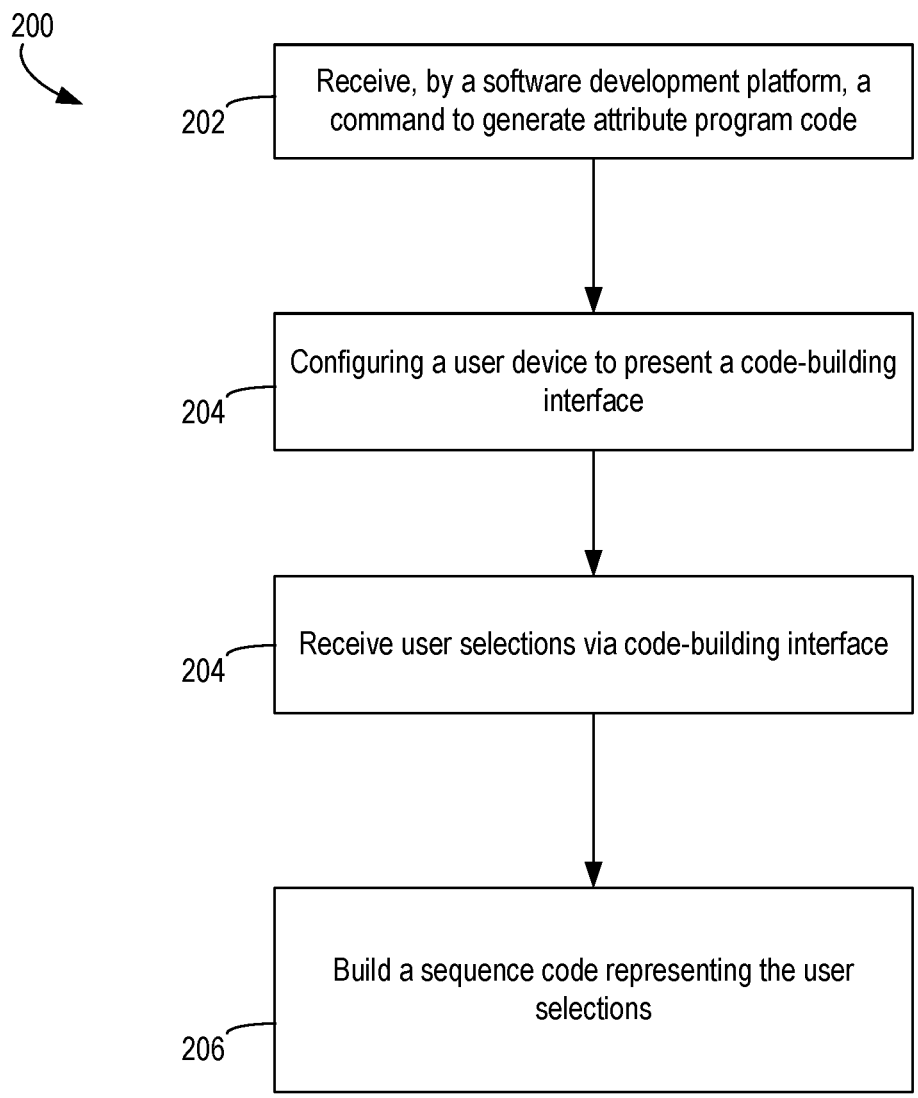
FIG. 2 depicts an example of a process for creating a sequence code usable by a software development tool to generate executable program code.

FIG. 2 depicts an example of a process 200 for creating a sequence code that is usable by a software development tool to generate executable program code. For illustrative purposes, the process 200 is described with reference to implementations described with respect to the example depicted in FIG. 1. However, other implementations are possible and are within the scope of this disclosure. The operations in FIG. 2 are implemented in program code that is executed by one or more computing devices, such as the development computing system 114, the host computing system 102, or some combination thereof. In some aspects of the present disclosure, one or more operations shown in FIG. 2 may be omitted or performed in a different order. Similarly, additional operations not shown in FIG. 2 may be performed.

At block 202, the process 200 involves receiving, by a software development platform, a command to generate executable program code. For example, the development computing system 114 can receive a request to generate executable program code from a host computing system 102 via the external-facing subsystem 110.

At block 204, the process 200 involves configuring a user device to present a code-building interface. For example, the sequence-building tool 115 can be executed by the development computing system 114 to provide or update a code-building interface. The code-building interface can include various components that are configured to receive inputs regarding various aspects of the executable program code to be generated. For instance, the code-building interface can include an operation-selection menu for selecting one or more operations to be performed by the executable program code, a type-selection menu for selecting one or more data types, and a condition menu for selecting one or more conditions for the executable program code.

Figure 3A:
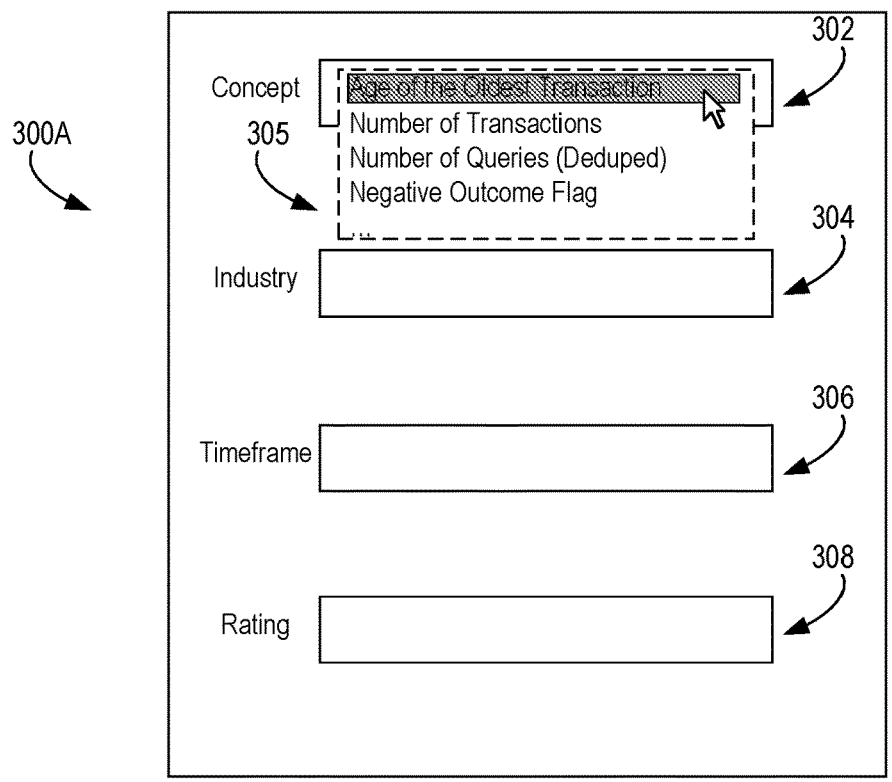
FIGS. 3A-3D depict an example of a code-building interface useable to select operations, data types, and conditions applicable for the purpose of constructing the sequence code.

An example of a code-building interface 300A is depicted in FIG. 3A. In this example, a code-building interface 300A generated with the sequence-building tool 115 includes an operation-selection menu 302, a type-selection menu 304, and condition menus 306 and 308. The operation-selection menu 302 is labeled "concept" in the code-building interface 300A. The type-selection menu 304 is labeled "industry" in the code-building interface 300A and is configured to receive a selection of one or more data sources from a list of data sources having a particular type of data to be used in the executable program code. In an illustrative example, these data sources include different entity data repositories 120, different tables within a common entity data repository 120, or other data sources.

Figure 3B:
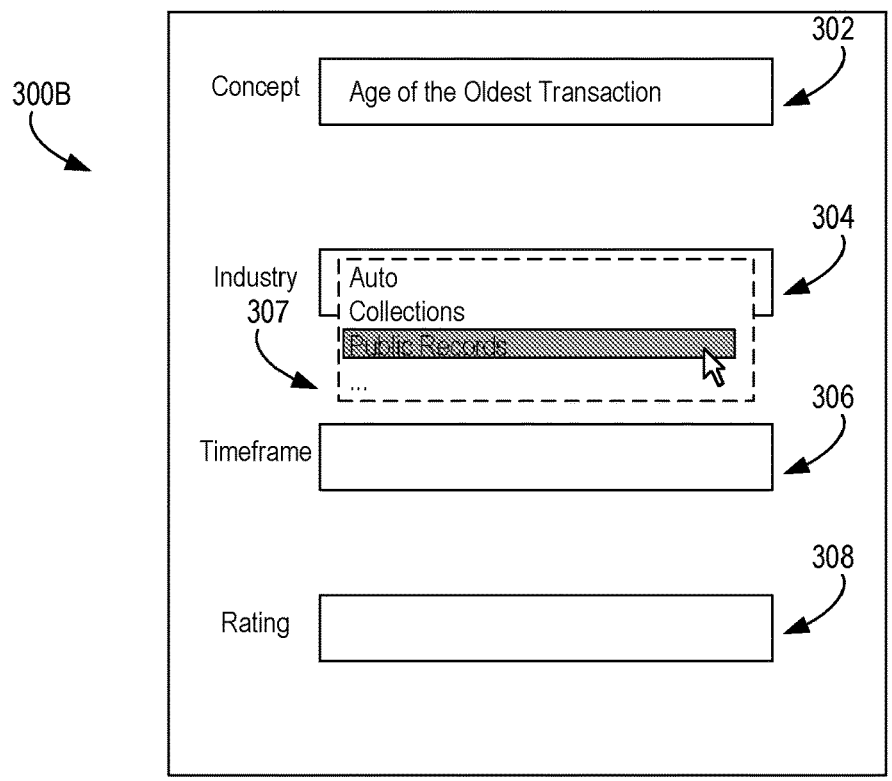

An example of using the code-building interface 300A to select different operations, data types, and conditions is depicted in FIGS. 3A-3D. For instance, in FIG. 3A, a drop-down menu 305 for selecting from a limited set of operations is provided. An input received via the code-building interface 300A can select one of these operations from the drop-down menu 305. Other examples of implementing the operation-selection menu 302 include a set of radio buttons, a text field, or another field suitable for receiving user input specifying a selection from a set of operations. In FIG. 3B, the code-building interface 300B includes this selection of the operation. Furthermore, in FIG. 3B, a drop-down menu 307 for selecting from a limited set of data sources is provided. An input received via the code-building interface 300B can select one of these data sources from the drop-down menu 307. Other examples of implementing the type-selection menu 304 include a set of radio buttons, a text field, or another field suitable for receiving user input specifying a selection from a set of operations.

Figure 3C:
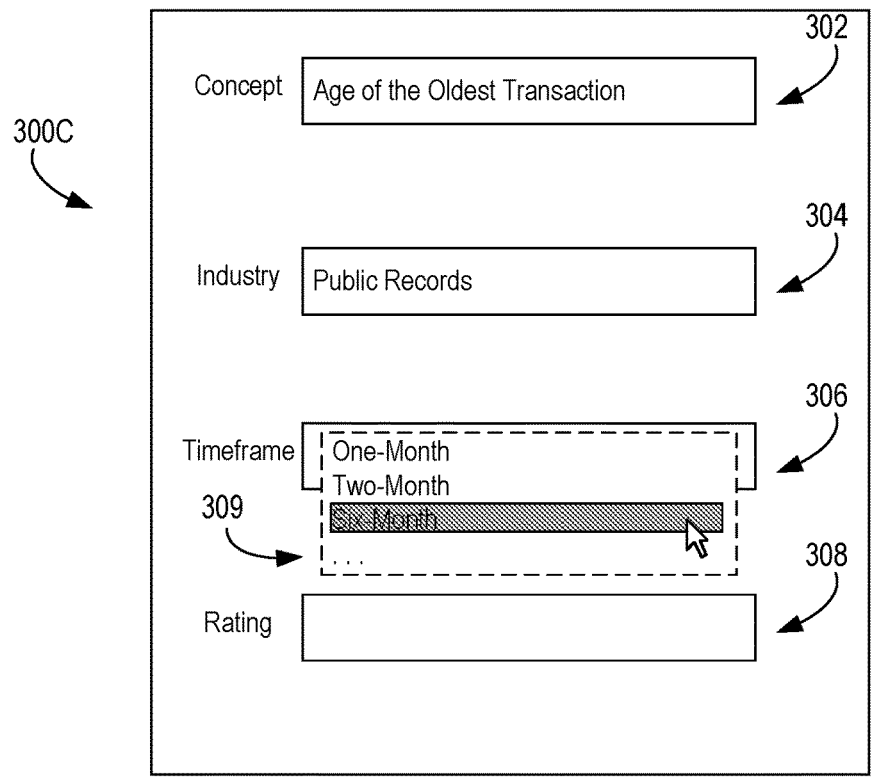
Figure 3D:
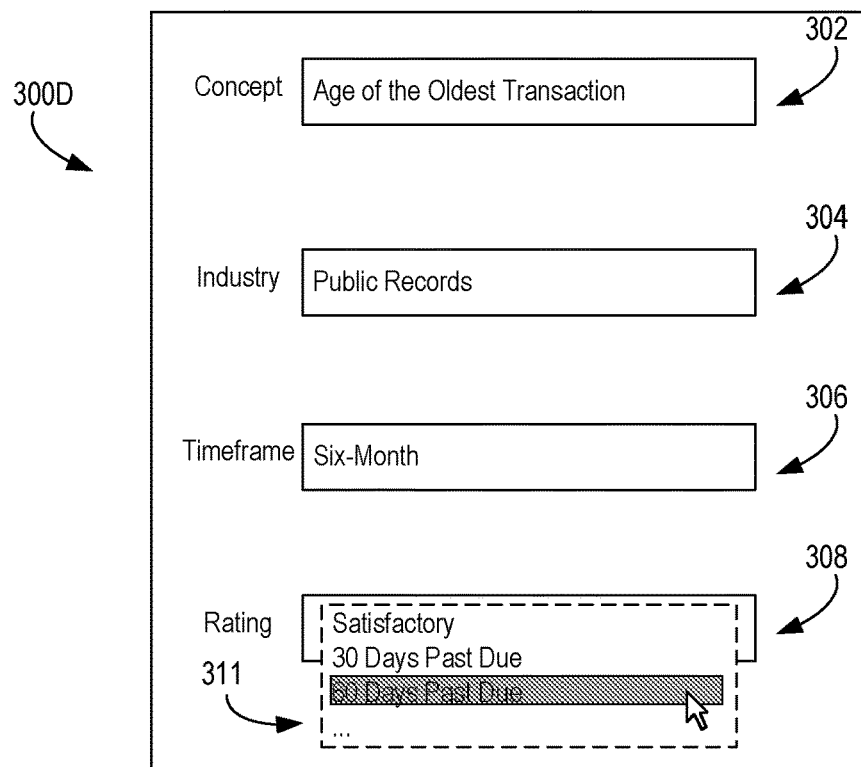

FIGS. 3C and 3D continue this example, where specific conditions are specified. In FIG. 3C, a code-building interface 300C has been updated to include the operation and data type or data source selections. A drop-down menu 309 is used to select a time frame from a list of available time frames. In FIG. 3D, a code-building interface 300D has been updated to include the operation, data type/data source, and time frame selections. A drop-down menu 311 is used to select a rating from a list of available ratings.

In some aspects, a code-building interface is dynamic such that a selection in one component of the code-building interface restricts available options in other components of the code-building interface. For instance, if a particular operation selected via the operation-selection menu 302 can only be performed on data from a subset of available data sources, then the sequence-building tool 115 modifies the code-building interface such that the type-selection menu 304 only provides that subset of data sources as an option (e.g., by excluding data sources outside the subset from a drop-down menu, deactivating radio buttons that would be used to select data sources outside the subset, or through other mechanisms). Additionally or alternatively, if a particular operation selected via the operation-selection menu 302 uses only one of the conditions (e.g., performs an operation based on timeframe but not rating), then the sequence-building tool 115 modifies the code-building interface such that unused conditions are not available via the code-building interface (e.g., by deactivating or removing interface elements that would otherwise be used to select the unused condition). In this example, the sequence code generated by the sequence-building tool 115 includes a value indicating the non-use of a condition. For instance, a "00" or "XX" value for the "timeframe" component of the sequence code could indicate that the code-building engine should not reference the mapping data for timeframes when building the attribute source code (i.e., because the attribute source code will not perform any timeframe-based operations).

Returning to FIG. 2, at block 206, the process 200 involves receiving user selections via the code-building interface. For instance, the sequence-building tool 115 can be executed by the development computing system 114 to receive one or more messages from the host computing system 102. The received messages can identify the fields of the code-building interface and the accompanying inputs that the host computing system 102 received in the fields of the code-building interface.

At block 208, the process 200 involves building a sequence code representing the user selections and, thus, identifying a combination of operations, data types, and conditions corresponding to such user selections. For instance, the sequence-building tool 115 can be executed by the development computing system 114 to build a sequence code that includes various character sets corresponding to operations, data types, and conditions.

Figure 4:
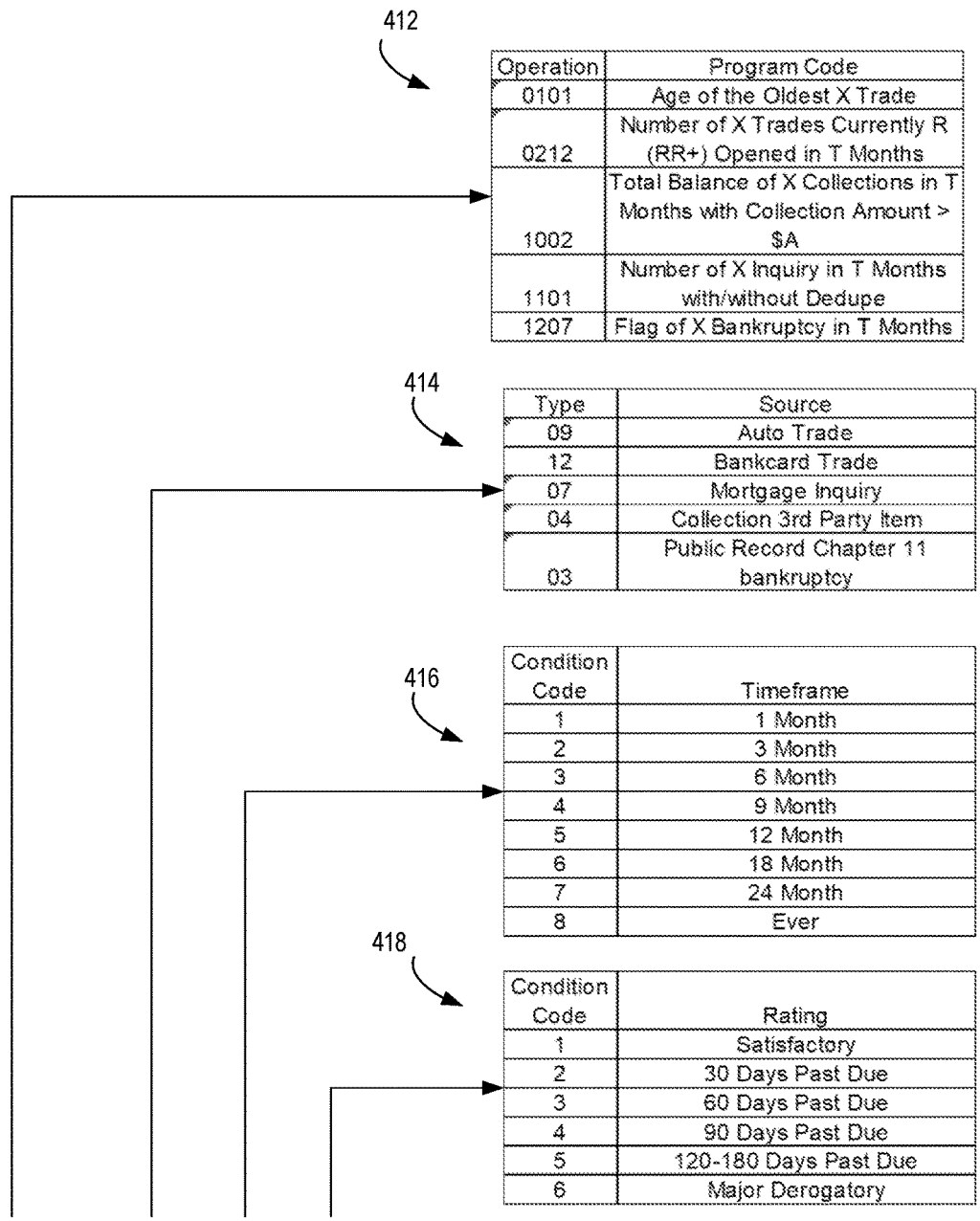
FIG. 4 depicts an example of a sequence code that can be generated by a sequence-building tool, such as by way of the code-building interface.

FIG. 4 depicts an example of a sequence code 402 that can be generated by the sequence-building tool 115. In this example, the sequence code 402 includes character sets 404, 406, 408, and 410. Each character set can provide an index value that a software development platform can use, in combination with one or more sets of mapping data, to identify relevant portions of executable program code to be assembled.

For instance, mapping data 412 includes a set of indices in the "operation" column that respectively identify program code portions that perform different operations. For illustrative purposes, the "program code" column includes plain language descriptions of certain program operations. In some aspects, though, mapping data 412 could include file names or module names for certain portions of executable program code, network locations of certain portions of executable program code, pointers to certain portions of executable program code, etc.

In this example, mapping data 414 includes a set of indices in the "type" column that respectively identify data sources that can provide inputs to program code portions identified in the mapping data 412. For illustrative purposes, the "program code" column includes plain language descriptions of certain data sources (e.g., "auto trade," "bankcard trade," etc.). In some aspects, though, mapping data 414 could include identifiers of database or other data structures having relevant data objects, network locations of such data sources, or other suitable identifiers that allow a software development platform to edit a portion of program code identified in the mapping data 412 such that the program code retrieves data from a relevant data source.

In this example, mapping data 416 and 418 identify various conditions that can be inserted into program code portions identified in the mapping data 412. For instance, mapping data 416 includes a set of indices in the "condition code" column that respectively identify time frames to which an appropriate variable in a program code portion can be set, and mapping data 418 includes a set of indices in the "condition code" column that respectively identify ratings to which an appropriate variable in a program code portion can be set.

In an illustrative example, a software development platform can use the character set 404 in combination with mapping data 412 to identify program code that, when executed by processing hardware, performs a certain operation corresponding to a user selection from the code-building interface. The software development platform can also use the character set 406 in combination with mapping data 414 to identify a data source that includes data records having a type corresponding to a user selection from the code-building interface. The software development platform can also use the character set 408, which identifies a time component of a condition, in combination with mapping data 416 to identify a time frame corresponding to a user selection from the code-building interface. The software development platform can also use the character set 410, which identifies a rating component of a condition, in combination with mapping data 416 to identify a rating corresponding to a user selection from the code-building interface.

Figure 5:
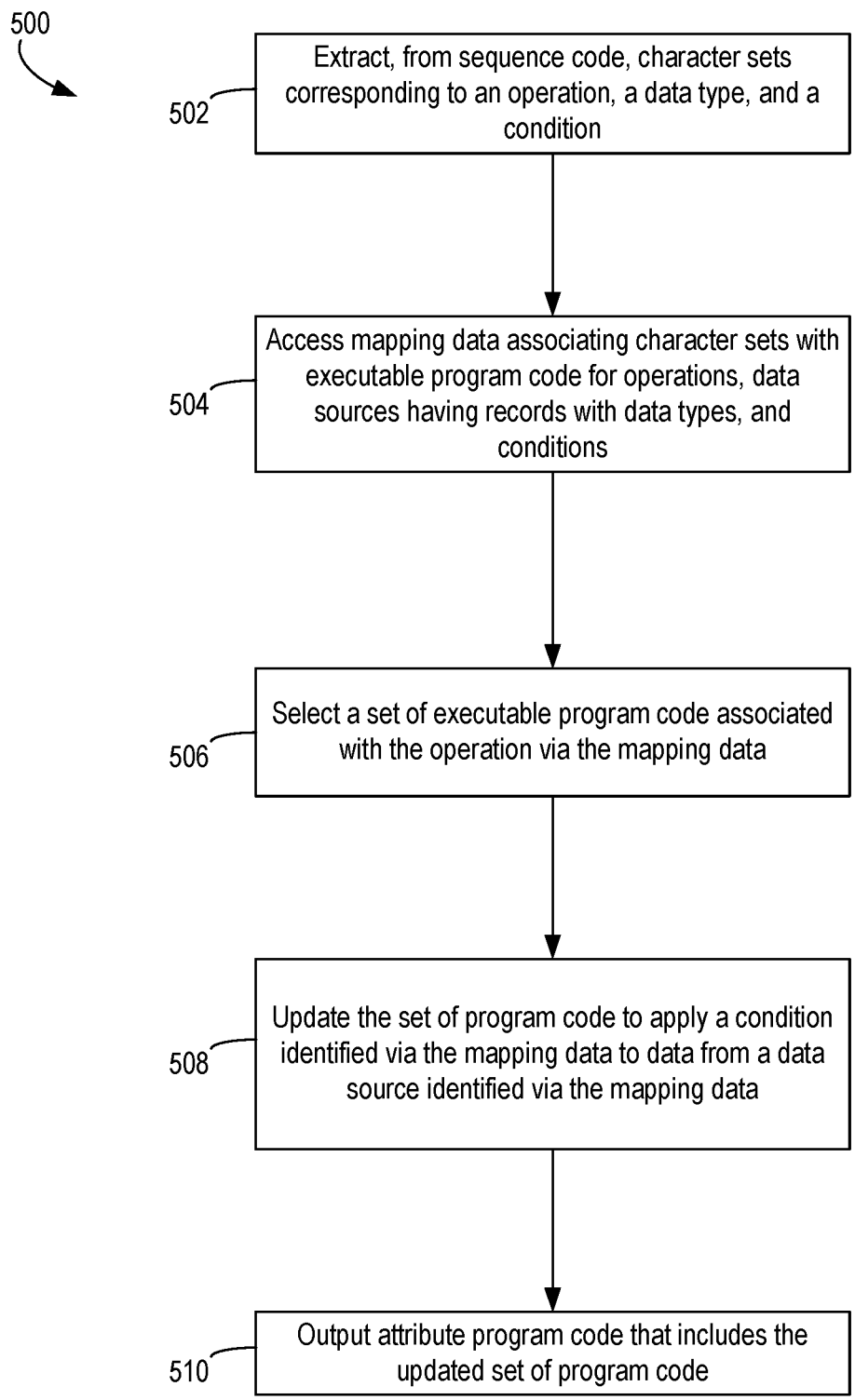
FIG. 5 depicts an example of a process for building executable program code from the sequence code.

FIG. 5 depicts an example of a process 500 for building executable program code from a sequence code. For illustrative purposes, the process 500 is described with reference to implementations described with respect to various examples depicted in FIG. 1. Other implementations, however, are possible. The operations in FIG. 5 are implemented in program code that is executed by one or more computing devices, such as the development computing system 114, the host computing system 102, or some combination thereof. In some aspects of the present disclosure, one or more operations shown in FIG. 5 may be omitted or performed in a different order. Similarly, additional operations not shown in FIG. 5 may be performed.

At block 502, the process 500 can involve extracting, from a sequence code, character sets corresponding to an operation, a data type, and a condition. For instance, the code-building engine 116 can be executed by the development computing system 114 to extract the character sets by parsing the sequence code. The code-building engine 116 could identify one or more character sets as corresponding to an operation selected via an operation-selection menu. The code-building engine 116 could also identify one or more character sets as corresponding to a data type selected via the type-selection menu. The code-building engine 116 could also identify one or more character sets as corresponding to a condition selected via the condition menu.

The code-building engine 116 can be configured to identify different character sets based on their sequential position in the sequence code and their length. For instance, the code-building engine 116 could be configured to extract, as an "operation" character set, a set of one or more characters that occur first in the sequence code and that have a specified length. In the example depicted in FIG. 4, the code-building engine 116 is configured to select the four numbers following the "A" as the "operation" character set 404. Continuing with this example, the code-building engine 116 could be configured to extract, as a "type" character set, a set of one or more characters that occur immediately after the "operation" character set in the sequence code and that have another specified length. In the example depicted in FIG. 4, the code-building engine 116 is configured to select the two numbers following the "operation" character set 404 as the "type" character set 406. The code-building engine 116 could continue in this manner with other sequence positions and other lengths of character sets. In the example depicted in FIG. 4, the code-building engine 116 is configured to select single numbers following the "type" character set 406 as a "condition" character set 408 identifying a time component, and to select single numbers following the character set 408 and the zero value as character set 410 identifying a rating component.

At block 504, the process 500 can involve accessing mapping data associating character sets with executable program code for operations, data sources having records with data types, and conditions. For instance, the code-building engine 116 can access a database or other data structure having mapping data. The mapping data is indexed in a manner that allows the code-building engine 116 to use the extracted character sets from block 502 to reference relevant portions of the mapping data.

In the example depicted in FIG. 4, the code-building engine 116 can use the character set 404 to identify, in the mapping data 412, program code performing an operation indicated by the "0212" operation code. The code-building engine 116 can use the character set 406 to identify, in the mapping data 414, a data source having records matching the data type indicated by the "12" type code. The code-building engine 116 can use the character set 408 to identify, in the mapping data 416, a time component indicated by the "3" condition code. The code-building engine 116 can use the character set 410 to identify, in the mapping data 418, a rating component indicated by the "2" condition code.

At block 506, the process 500 can involve selecting an executable program code module associated with the operation via the mapping data. The executable program code module could be written in one or more of various programming languages, such as C++ or Python. For instance, the code-building engine 116 can access a program code library. The program code library can include pre-written code and subroutines that can be used as templates or building blocks making up the executable program code module. The code-building engine 116 can use an identifier retrieved from the mapping data to select from the code library a set of one or more code blocks as the executable program code module. The code-building engine 116 can create a copy of the executable program code module. For instance, the code-building engine 116 can create a copy of an executable program code module for performing a "Number of X Trades Currently R (RR+) Opened in T Months" operation that was identified in the mapping data 412 using the character set 404.

This executable program code module can include variables (e.g., within code lines or within associated configuration data) that are modified based on other character sets extracted from the sequence code. For instance, at block 508, the process 500 can involve updating the executable program code module to apply a condition identified via the mapping data to data from a data source identified via the mapping data. For instance, the code-building engine 116 can modify the executable program code module selected at block 506 (e.g., the copy of the code referenced from the code library) so that the executable program code module can submit queries to one or more data sources identified using the "type" character set (e.g., the character set 406 in FIG. 4) and use the data returned in response to those queries as inputs to one or more functions of the program code. The code-building engine 116 can modify the executable program code module selected at block 506 (e.g., the copy of the code referenced from the code library) so that relevant variables in the executable program code module are set to values that are identified using one or more "condition" character sets. For instance, the code-building engine 116 can modify a "timeframe" variable in the executable program code module to have a "six month" value that was identified in the mapping data 416 using the character set 408. Similarly, the code-building engine 116 can modify a "rating" variable in the executable program code module to have a "30 days past due" value that was identified in the mapping data 418 using the character set 410.

At block 510, the process 200 can involve outputting executable program code 130 that includes the updated version of the executable program code module. For example, the code-building engine 116 can output the executable program code 130 to a host computing system 102. Outputting the program code can include, for example, storing the program code in a non-transitory computer-readable medium accessible by the host computing system 102, transmitting the program code to the host computing system 102 via one or more data networks, or some combination thereof.

For illustrative purposes, the description above involves examples having a single operation, a single data source, and conditions limited to time frame and rating. However, other implementations are possible. For instance, a sequence code can include multiple operations, multiple data sources, conditions different from or in addition to the examples described herein, or some combination thereof.

Using a sequence code to build executable program code, as described above with respect to FIGS. 1-5, can improve a process for generating executable program code. For instance, various components used to build executable program code can be extended by adding character sets to a sequence code, adding appropriate mapping data corresponding to the added character sets, and updating the code-building engine 106 to identify those added character sets based on their position in the sequence code and their length.

Additionally or alternatively, the effectiveness of a sequence-building tool in a software development platform can be improved because the sequence code allows for simpler correction or replacement of certain components in executable program code. For instance, the sequence-building tool can select a previously created sequence code, populate a code-building interface from FIGS. 3A-3D with the selections corresponding to the sequence code. A user can modify one or more of these selections, and the sequence-building tool 115 can receive data identifying these changes in the selections. The sequence-building tool 115 can modify the previously created sequence code to reflect the changes. The code-building engine 116 can detect a change in the sequence code and generate updated executable program code based on the modified sequence code.

In one example, a sequence-building tool can update, based on inputs to a code-building interface, an "operation" character set of the sequence code. The sequence-building tool 115 can create a modified sequence code having the updated "operation" character set along with other, previously selected character sets. The code-building engine 116 can detect the change to the "operation" character set and perform block 506 using the changed "operation" character set. In this manner, the code-building engine 116 can identify a different set of executable program code that is associated, via one or more mappings in a set of mapping data, with the updated "operation" character set and update the different set of executable program code as described above with respect to block 508 (e.g., by updating the different set of executable program code to apply the condition previously identified using the sequence code to data retrieved from the data source previously identified using the sequence code).

In another example, a sequence-building tool can update, based on inputs to a code-building interface, a "timeframe" character set of the sequence code. The sequence-building tool 115 can create a modified sequence code having the updated "timeframe" character set and along with other, previously selected character sets. The code-building engine 116 can detect the change to the "timeframe" character set and perform block 508 using the changed "timeframe" character set. In this manner, the code-building engine 116 can update a relevant variable in a set of previously generated executable program code to include a modified "timeframe" value.

In another example, a sequence-building tool can update, based on inputs to a code-building interface, a "rating" character set of the sequence code. The sequence-building tool 115 can create a modified sequence code having the updated "rating" character set and along with other, previously selected character sets. The code-building engine 116 can detect the change to the "rating" character set and perform block 508 using the changed "rating" character set. In this manner, the code-building engine 116 can update a relevant variable in a set of previously generated executable program code to include a modified "rating" value.

In some aspects, the effectiveness of a software development platform can be improved by using a sequence code to generate executable program code because the sequence code reduces manual effort involved in verifying that various sets of executable program code perform as expected. For instance, developing executable program code without a sequence code involves analysts manually drafting narrative specifications for executable program code and programmers making choices on how to capture those narrative specifications via executable program code. In this example where executable program code is developed without using sequence codes, thousands of sets of executable program code must be independently audited to ensure that each set of executable program code works as expected. Furthermore, if executable program code is developed without executable program code without using sequence codes, then coding errors identified through an auditing process for one set of executable program code may provide little or no insight as to potential errors to be fixed in other sets of executable program code.

By contrast, if executable program code is developed using sequence codes as described herein with respect to FIGS. 1-5, the auditing process for one set of executable program code can be used to efficiently fix or verify the operation of other sets of executable program code. In one example, the development computing system 114 can build and/or maintain an auditing table that captures the results of the process 500. For instance, the development computing system 114 can add an entry to the table having one or more fields that identify a sequence code used to generate a particular set of executable program code and an identifier of the executable program code. The one or more fields that identify a sequence code could include an identifier of an "operation" character set, which thereby identifies a set of executable program code selected at block 506 to build the executable program code. Numerous sets of executable program code can be generated with the process 500. In an auditing process, a representative set of executable program code can be tested by providing test inputs to the executable program code and verifying that outputs generated by the executable program code match known outputs associated with the test inputs. If the test indicates an error in the executable program code, the development computing system 114 can be used to modify the executable program code that was selected at block 506 and thereby eliminate or reduce the error.

Furthermore, continuing with this example, the development computing system 114 can be used to reference the auditing table and thereby identify other sets of executable program code built from similar sequence codes (e.g., sets of executable program code with the same "operation" character set). The development computing system 114 can re-generate the identified sets of executable program code using the modifications to the executable program code that were performed as a result of the auditing process. In this manner, rather than expending manual effort on independently testing various sets of executable program code and repeatedly correcting the same error in each of them, a representative set of executable program code can be tested and the results of that test can be automatically applied to other sets of executable program code that were generated from similar sequence codes.

In some aspects, the development computing system 114 can perform one or more steps described above automatically. For instance, if the audit process for a set of executable program code identifies an error, the development computing system 114 can automatically identify, via an auditing table, related sets of executable program code that were generated from similar sequence codes. If the development computing system 114 detects (or is provided with) a successful test of the set of executable program code after executable program code has been modified to address the error, the development computing system 114 can automatically regenerate the related sets of executable program code using the modification (e.g., by performing one or more operations in process 500 for each similar sequence code in the auditing table).

Computing System Example

Figure 6:
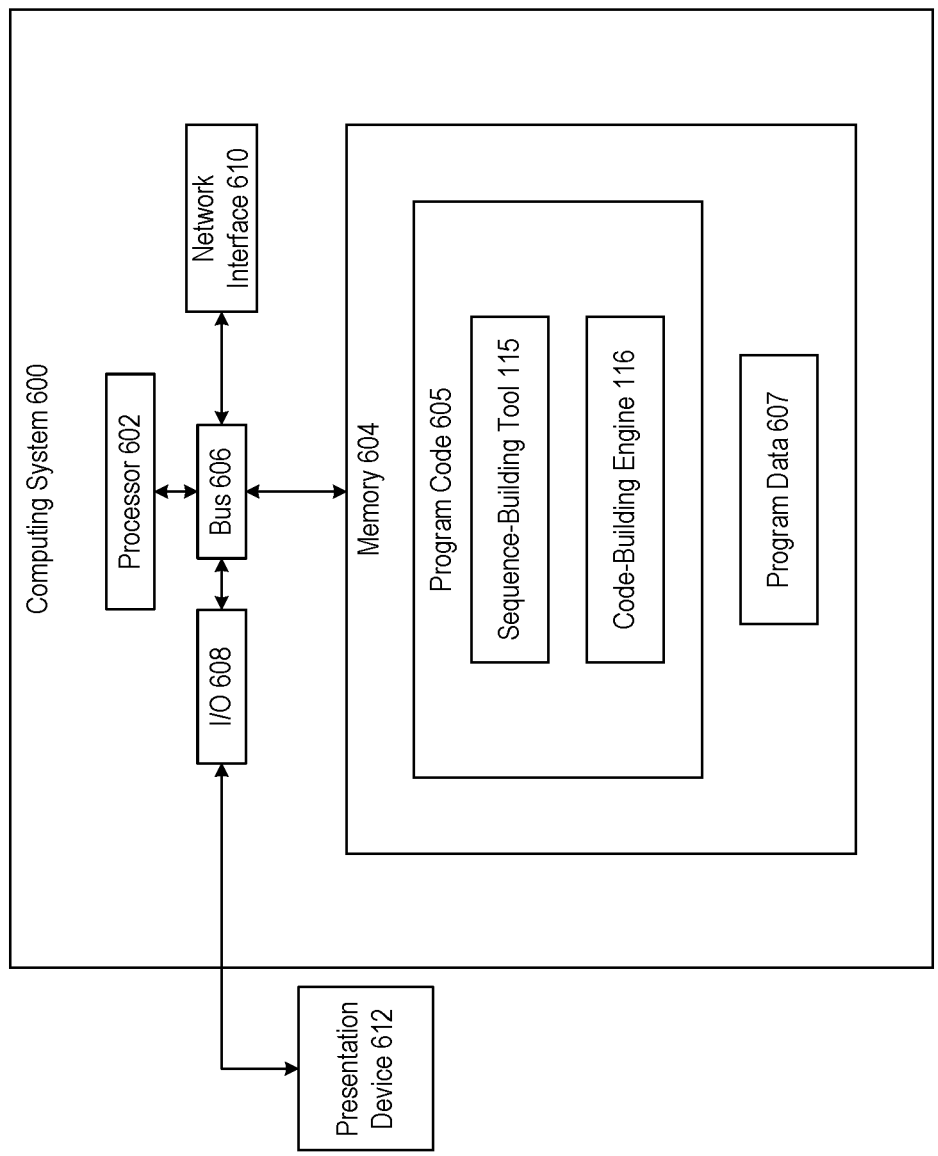
FIG. 6 is a diagram depicting an example of a computing system that can be used to implement aspects described herein.

Any suitable computing system or group of computing systems can be used to perform the operations described herein. For example, FIG. 6 is a block diagram depicting an example of a computing system 600 that can be used to implement one or more of the systems depicted in FIG. 1 (e.g., a host computing system 102, a development computing system 114, etc.). The example of the computing system 600 can include various devices for communicating with other devices in the computing environment 100, as described with respect to FIG. 1. The computing system 600 can include various devices for performing one or more of the operations described above.

The computing system 600 can include a processor 602, which includes one or more devices or hardware components communicatively coupled to a memory 604. The processor 602 executes computer-executable program code 605 stored in the memory 604, accesses program data 607 stored in the memory 604, or both. Examples of a processor 602 include a microprocessor, an application-specific integrated circuit, a field-programmable gate array, or any other suitable processing device. The processor 602 can include any number of processing devices, including one. The processor 602 can include or communicate with a memory 604. The memory 604 stores program code that, when executed by the processor 602, causes the processor to perform the operations described in this disclosure.

The memory 604 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, a CD-ROM, DVD, ROM, RAM, an ASIC, magnetic tape or other magnetic storage, or any other medium from which a computer processor can read and execute program code. The program code may include processor-specific program code generated by a compiler or an interpreter from code written in any suitable computer-programming language. Examples of suitable programming language include C, C++, C #, Visual Basic, Java, Python, Perl, JavaScript, ActionScript, etc.

The computing system 600 can execute program code 605. The program code 605 may be stored in any suitable computer-readable medium and may be executed on any suitable processing device. For example, as depicted in FIG. 6, program code for the sequence-building tool 115 or the code-building engine 116 can reside in the memory 604 at the computing system 600. Executing the program code 605 can configure the processor 602 to perform one or more of the operations described herein.

Program code 605 stored in a memory 604 may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc., may be passed, forwarded, or transmitted via any suitable means including memory sharing, message passing, token passing, network transmission, among others. Examples of the program code 605 include one or more of the applications, engines, or sets of program code described herein, such as a code-building engine 116, an interactive computing environment presented to a consumer computing system 106, executable program code 130, a predictive response application 104, etc.

Examples of program data 607 stored in a memory 604 may include one or more databases, one or more other data structures, datasets, etc. For instance, if a memory 604 is a network-attached storage device 118, program data 607 can include predictor data samples 122, response data samples 124, etc. If a memory 604 is a storage device used by a host computing system 102 or a host computing system 102, program data 607 can include predictor variable data, data obtained via interactions with consumer computing systems 106, etc.

The computing system 600 may also include a number of external or internal devices such as input or output devices. For example, the computing system 600 is shown with an input/output interface 608 that can receive input from input devices or provide output to output devices. A bus 606 can also be included in the computing system 600. The bus 606 can communicatively couple one or more components of the computing system 600.

In some aspects, the computing system 600 can include one or more output devices. One example of an output device is the network interface device 610 depicted in FIG. 6. A network interface device 610 can include any device or group of devices suitable for establishing a wired or wireless data connection to one or more data networks (e.g., a public data network 108, a private data network 112, etc.). Non-limiting examples of the network interface device 610 include an Ethernet network adapter, a modem, etc. Another example of an output device is the presentation device 612 depicted in FIG. 6. A presentation device 612 can include any device or group of devices suitable for providing visual, auditory, or other suitable sensory output. Non-limiting examples of the presentation device 612 include a touchscreen, a monitor, a speaker, a separate mobile computing device, etc.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Unless specifically stated otherwise, it is appreciated that throughout this specification terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter is described with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such variations or additions as would be readily apparent to one of ordinary skill in the art.

What is claimed is:

1. A method comprising:
receiving a command to generate executable program code;
configuring a user device to present a code-building interface enabling entry of operations, data types, and conditions for the executable program code, wherein the code-building interface is configured to display an operation-selection menu usable to select one or more operations to be performed by the executable program code, a type-selection menu usable to select one or more data types, and a condition-selection menu usable to select one or more conditions for the executable program code, and wherein each of the operation-selection menu, the type-selection menu, and the condition-selection menu comprises a set of drop down menus, a set of radio buttons, a set of text fields, or any combination thereof;
receiving, via the code-building interface, a first user input indicating an operation to be performed by the executable program code, a data type for the executable program code, and a condition for application of the executable program code;
constructing a sequence code representing the first user input, wherein the sequence code comprises a sequence of character sets corresponding to the first user input;
extracting, from the sequence code, a first character set corresponding to the operation, a second character set corresponding to the data type, and a third character set corresponding to the condition; and
applying mapping data to the first character set, the second character set, and the third character set to generate the executable program code.

2. The method of claim 1, further comprising:
receiving, via the code-building interface, a second user input indicating an update to the first character set to generate a modified sequence code having the updated first character set, the second character set, and the third character set; and
modifying the executable program code based on the second user input.

3. The method of claim 1, wherein applying the mapping data to the first character set, the second character set, and the third character set to generate the executable program code comprises:
accessing one or more mappings that (i) associate the first character set with an executable program code module that performs the operation, (ii) associate the second character set with a data source having records matching the data type, and (iii) associate the third character set with the condition;
selecting the executable program code module identified via the one or more mappings; and
updating the executable program code module to apply the condition to data retrieved from the data source.

4. The method of claim 3, wherein the data type identifies an industry and the data retrieved from the data source describes transactions specific to the industry.

5. The method of claim 3, wherein:
the condition includes a time component and a rating component;
a first subset of the third character set corresponds to the time component; and
a second subset of the third character set corresponds to the rating component.

6. The method of claim 3, further comprising:
detecting an update from the first character set to an updated first character set;
identifying a different executable program code module that is associated, via the mapping data, with the updated first character set; and
based on the update, updating the different executable program code module to apply the condition to the data retrieved from the data source.

7. The method of claim 3, further comprising:
detecting an update from the second character set to an updated second character set;
accessing, via the mapping data, an association between the updated second character set and a different data type; and
based on the update, updating the executable program code by modifying the executable program code module to apply the condition to data retrieved from a different data source having records matching the different data type.

8. The method of claim 3, further comprising:
detecting an update from the third character set to an updated third character set;
accessing, via the mapping data, an association between the updated third character set and a different condition; and
based on the update, updating the executable program code by modifying the executable program code module to apply the different condition to the data retrieved from the data source.

9. A software development platform comprising:
one or more processing devices, including a processor and a memory, configured to execute:
a sequence-building tool of the software development platform, the sequence-building tool configured to:
receive a command to generate executable program code;
configure a user device to present a code-building interface enabling entry of operations, data types, and conditions for the executable program code, wherein the code-building interface is configured to display an operation-selection menu for selecting one or more operations to be performed by the executable program code, a type-selection menu for selecting one or more data types, and a condition-selection menu for selecting one or more conditions for the executable program code, and wherein each of the operation-selection menu, the type-selection menu, and the condition-selection menu comprises a set of drop down menus, a set of radio buttons, a set of text fields, or any combination thereof;
receive first user selections via the operation-selection menu, the type-selection menu, and the condition-selection menu; and
build a sequence code representing the first user selections, wherein the sequence code comprises a sequence of character sets corresponding to the first user selections; and
a code-building engine of the software development platform, the code-building engine configured to:
extract a first character set corresponding to an operation selected via the operation-selection menu, a second character set corresponding to a data type selected via the type-selection menu, and a third character set corresponding to a condition selected via the condition-selection menu; and apply mapping data to the first character set, the second character set, and the third character set to generate the executable program code.

10. The software development platform of claim 9, wherein the code-building engine is further configured to:
receive a second user selection indicating an update to the first character set to generate a modified sequence code having the updated first character set, the second character set, and the third character set; and
modify the executable program code based on the second user selection.

11. The software development platform of claim 9, wherein the code-building engine is further configured to apply the mapping data to the first character set, the second character set, and the third character set to generate the executable program code by:
accessing one or more mappings that (i) associate the first character set with an executable program code module that performs the operation, (ii) associate the second character set with a data source having records matching the data type, and (iii) associate the third character set with the condition;
selecting the executable program code module identified via the one or more mappings; and
updating the executable program code module to apply the condition to data retrieved from the data source.

12. The software development platform of claim 11, wherein:
the data type identifies an industry and the data retrieved from the data source describes transactions specific to the industry;
the condition includes a time component and a rating component;
a first subset of the third character set corresponds to the time component; and
a second subset of the third character set corresponds to the rating component.

13. The software development platform of claim 11, wherein the code-building engine is further configured to:
detect an update from the first character set to an updated first character set;
identify a different executable program code module that is associated, via the mapping data, with the updated first character set; and
based on the update, update the different executable program code module to apply the condition to the data retrieved from the data source.

14. The software development platform of claim 13, wherein the code-building engine is further configured to:
detect an update from the second character set to an updated second character set;
access, via the mapping data, an association between the updated second character set and a different data type; and
based on the update, update the executable program code by modifying the different executable program code module to apply the condition to data retrieved from a different data source having records matching the different data type.

15. The software development platform of claim 13, wherein the code-building engine is further configured to:
detect an update from the third character set to an updated third character set;

access, via the mapping data, an association between the updated third character set and a different condition; and
based on the update, update the executable program code by modifying the different executable program code module to apply the different condition to the data retrieved from the data source.

16. A method comprising:
receiving, by a software development platform, a command to generate executable program code;
configuring, by a sequence-building tool of the software development platform, a user device to present a code-building interface comprising an operation-selection menu for selecting one or more operations to be performed by the executable program code, a type-selection menu for selecting one or more data types, and a condition-selection menu for selecting one or more conditions for the executable program code, wherein the code-building interface is configured to display the operation-selection menu usable to select the one or more operations to be performed by the executable program code, the type-selection menu usable to select the one or more data types, and the condition-selection menu usable to select the one or more conditions for the executable program code, and wherein each of the operation-selection menu, the type-selection menu, and the condition-selection menu comprises a set of drop down menus, a set of radio buttons, a set of text fields, or any combination thereof;
receiving first user selections via the operation-selection menu, the type-selection menu, and the condition-selection menu;
building, by the sequence-building tool of the software development platform, a sequence code representing the first user selections, wherein the sequence code comprises a sequence of character sets corresponding to the first user selections; and
generating, by a code-building engine of the software development platform, the executable program code by:
extracting a first character set corresponding to an operation selected via the operation-selection menu, a second character set corresponding to a data type selected via the type-selection menu, and a third character set corresponding to a condition selected via the condition-selection menu;
accessing one or more mappings that (i) associate the first character set with an executable program code module that performs the operation, (ii) associate the second character set with a data source having records matching the data type, and (iii) associate the third character set with the condition; and
updating the executable program code module to apply the condition to data retrieved from the data source.

17. The method of claim 16, further comprising:
receiving, via the code-building interface, a second user selection indicating an update to the first character set to generate a modified sequence code having the updated first character set, the second character set, and the third character set; and
modifying the executable program code based on the second user selection.

18. The method of claim 16, further comprising:
detecting an update from the first character set to an updated first character set;

identifying a different executable program code module that is associated, via the one or more mappings, with the updated first character set; and based on the update, updating the different executable program code module to apply the condition to the data retrieved from the data source.

19. The method of claim 16, further comprising:

detecting an update from the second character set to an updated second character set;

accessing, via the one or more mappings, an association between the updated second character set and a different data type; and based on the update, updating the executable program code by modifying the executable program code module to apply the condition to data retrieved from a different data source having records matching the different data type.

20. The method of claim 16, further comprising:

detecting an update from the third character set to an updated third character set;

accessing, via the one or more mappings, an association between the updated third character set and a different condition; and based on the update, updating the executable program code by modifying the executable program code module to apply the different condition to the data retrieved from the data source.

\* \* \* \* \*